United States Patent [19]

Lamble et al.

[11] Patent Number: 5,516,897
[45] Date of Patent: May 14, 1996

[54] MONOAZO REACTIVE DYES AND SOLUTIONS THEREOF

[75] Inventors: Brian Lamble, Oldham; Aiden Lavery, Poynton; John A. Taylor, Prestwich, all of England

[73] Assignee: Zeneca Limited, London, England

[21] Appl. No.: 400,450

[22] Filed: Mar. 7, 1995

Related U.S. Application Data

[63] Continuation of Ser. No. 26,292, Mar. 4, 1993, abandoned.

[30] Foreign Application Priority Data

Mar. 6, 1992 [GB] United Kingdom ............. 9204905

[51] Int. Cl.$^6$ ............. C09B 62/085; C09B 62/028; C09B 62/002; C09B 67/22; D06P 3/87; D06P 1/382
[52] U.S. Cl. ............. 534/638; 8/549; 8/641; 534/573 M
[58] Field of Search ............. 534/638, 573 M; 8/549, 641

[56] References Cited

U.S. PATENT DOCUMENTS

| | | | |
|---|---|---|---|
| 2,820,785 | 1/1958 | Zollinger et al. | 534/638 |
| 2,903,442 | 9/1959 | Riat | 534/638 |
| 2,945,022 | 7/1960 | Fasciati et al. | 534/638 X |
| 2,951,072 | 8/1960 | Tilley et al. | 534/638 |
| 2,951,836 | 9/1960 | Stephen | 534/638 |
| 2,951,837 | 9/1960 | Andrew et al. | 534/638 |
| 3,151,105 | 9/1964 | Andrew et al. | 534/638 |
| 3,206,451 | 9/1965 | Benz et al. | 534/638 X |
| 3,413,077 | 11/1968 | Bertin et al. | 534/638 X |
| 3,519,614 | 7/1970 | Ponzini | 534/638 X |
| 3,709,869 | 1/1973 | Mazza | 534/638 |
| 4,563,518 | 1/1986 | Henk | 534/638 |
| 4,866,162 | 9/1989 | Seiler et al. | 534/638 X |
| 5,032,140 | 7/1991 | Yamanaka et al. | 534/638 X |
| 5,128,456 | 7/1992 | Tzikas et al. | 534/638 |

FOREIGN PATENT DOCUMENTS

| | | | |
|---|---|---|---|
| 053750 | 6/1982 | European Pat. Off. | 534/638 |
| 217217 | 4/1987 | European Pat. Off. | 534/630 |
| 0322457 | 7/1989 | European Pat. Off. | 534/638 |
| 422237 | 4/1991 | European Pat. Off. | 534/627 |
| 426616 | 5/1991 | European Pat. Off. | 534/638 |
| 1327016 | 4/1963 | France | 534/638 |
| 2436166 | 4/1980 | France | 534/638 |
| 970475 | 9/1964 | United Kingdom | 534/638 |
| 2003910 | 3/1979 | United Kingdom | 534/638 |
| 2128200 | 4/1984 | United Kingdom | 534/638 |
| 2183248 | 6/1987 | United Kingdom | 534/638 |
| 2186585 | 8/1987 | United Kingdom | 534/638 |
| 2250297 | 6/1992 | United Kingdom | 534/638 |

OTHER PUBLICATIONS

Chemical Abstracts, vol. 104, No. 26, Jun. 1986, Columbus, OH, Abstract No. 226328 Bando et al (corresponding to JP A–60–226 561).

Chemical Abstracts, vol. 110, No. 6, Feb. 1989, Columbus, OH, Abstract No. 40444u Yamanaka et al. (corresponding to JP A–63–179–790).

Chemical Abstracts, vol. 74, No. 22, May 1971, Columbus, OH, Abstract No. 113219z Jarkovsky et al.

Primary Examiner—Floyd D. Higel
Attorney, Agent, or Firm—Cushman Darby & Cushman

[57] ABSTRACT

A high strength aqueous solution comprising a first and second dye each of which, in the free acid form, is of Formula (1):

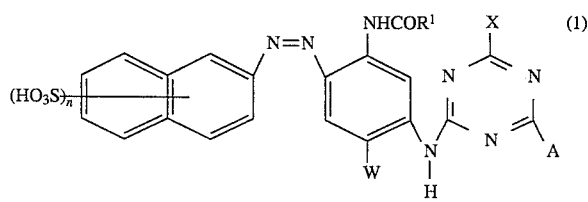

wherein:
$R^1$ is $NH_2$ or alkyl;
W is H, alkyl or alkoxy;
X is a labile atom or group;
A is

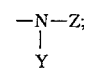

Y is H or alkyl;
Z is an optionally substituted phenyl group; and
n has a value of 1 to 3;
provided that
(i) the groups defined by A in the first and second dye are different to one another; and
(ii) the solution contains less than 5% by weight of inorganic compounds.

Also claimed are compositions and dyes of Formula (1).

16 Claims, No Drawings

MONOAZO REACTIVE DYES AND SOLUTIONS THEREOF

This is a continuation of application Ser. No. 08/026,292, filed on Mar. 4, 1993, which is now abandoned.

This invention relates to dye solutions and compositions, dyes, their preparation and use.

Reactive dyes suitable for the coloration of cellulosic materials such as cotton have been known for many years. However, there is a growing need for reactive dyes having good solubility in water to meet a demand for high strength liquid brands of such dyes. As the solubility of a dye increases more dye can be stored in solution and this leads to a reduction in storage space and transport costs for high strength liquid brands.

High solubility reactive dyes are also desirable because solubility is a limiting factor in the quantity of dye which can be manufactured in a given vessel at any one time. A high solubility reactive dye which also possesses good wash off properties would be particularly valuable.

We have surprisingly found that high strength solutions of certain triazinyl reactive dyes can be prepared by mixing two or more dyes which differ in the nature of one of the triazine substituents.

According to the present invention there is provided a high strength aqueous solution comprising a first and second dye each of which, in the free acid form, is of Formula (1):

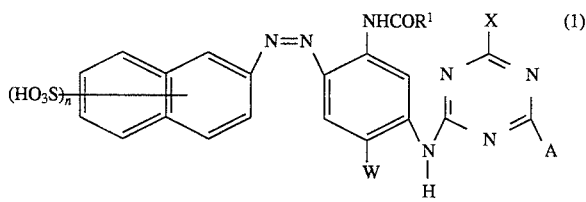

wherein:
- $R^1$ is $NH_2$ or alkyl;
- W is H, alkyl or alkoxy;
- X is a labile atom or group;
- A is

- Y is H or alkyl;
- Z is an optionally substituted phenyl group; and
- n has a value of 1 to 3;

provided that
(i) the groups defined by A in the first and second dye are different to one another; and
(ii) the solution contains less than 5% by weight of inorganic compounds.

It is preferred that the solution contains less than 1%, more preferably less than 0.5% by weight of inorganic compounds. Preferably the solution contains less than 20%, more preferably less than 10%, especially less than 5% by weight of urea and it is especially preferred that the solution is free from urea.

Preferably said first and second dye are identical in every respect except for the identity of the group represented by A.

The high strength aqueous solution is preferably contained in a sealed container, for example a water-proof drum.

It is preferred that the high strength aqueous solution contains a total amount of first and second dye of at least 20%, more preferably at least 30%, especially at least 40% and preferably below 60% by weight. The aqueous solution is preferably water.

When $R^1$ is alkyl it preferably contains from 1 to 4 carbon atoms, and more preferably is $C_{1-3}$-alkyl, especially methyl. Preferably $R^1$ is $NH_2$.

W is preferably $C_{1-4}$-alkyl, especially methyl; $C_{1-4}$-alkoxy, especially methoxy; or H.

The proviso which states that the groups defined by A in the first and second dye are different to one another means that A in each dye is different and both A groups fall within the definition given for A.

By a labile atom or group it is meant an atom or group which is bound directly to the triazine nucleus, which atom or group is readily replaceable by a hydroxy group in mildly alkaline aqueous conditions. As examples of such an atom or group there may be mentioned a halogen atom, for example for Cl; a sulphonic acid group; a thiocyano group; a quaternary ammonium group, for example a trialkyl ammonium group or an optionally substituted pyridinium group, for example 3- or 4-carboxy pyridinium. It is preferred that X is Cl, 3-carboxypyridinium or 4-carboxypyridinium.

n preferably has a value of 2, more preferably 3, especially where this results in a 1,5-disulphonaphthyl or 3,6,8-trisulphonaphthyl group.

Y is preferably H or $C_{1-4}$-alkyl, more preferably propyl or ethyl because this leads to dyes having particularly good solubility.

Z is preferably a phenyl group having one ortho halo or alkyl substituent, a sulpho substituent, or both an ortho halo or alkyl substituent and a sulpho substituent. The preference for Z having a sulpho substituent arises from the surprising finding that such dyes have particularly good wash off properties and solubility in water.

When Z has an ortho halo or alkyl substituent it is preferably Cl or $C_{1-4}$-alkyl, especially methyl.

As examples of groups represented by Z there may be mentioned phenyl, 2-sulphophenyl, 3-sulphophenyl, 4-sulphophenyl, 2-methyl-4-sulphophenyl and 2-methyl-5-sulphophenyl.

As particular examples of groups represented by A there may be mentioned 4-sulpho-2-methyl-N-methylanilinyl and 5-sulpho-2-methyl-N-methylanilinyl.

There is also a demand for solid dye compositions for the preparation of high strength liquid brands or for use directly by a dyer. Such compositions preferably have good solubility in water and good wash-off properties when applied to a cellulosic material.

According to a second aspect of the present invention there is provided a composition comprising a first and second dye each of which, in the free acid form, is of Formula (1) wherein $R^1$, W, X, A, Y, Z and n are as hereinbefore define and provided that the groups defined by A in the first and second dye are different to one another and provided that $R^1$ is $NH_2$ when W is H.

In the composition according to the present invention it is preferred that the first and second dye are identical in every respect except for the identity of A.

It is preferred that the composition contains less than 10%, more preferably less than 3%, especially less than 1% by weight of inorganic compounds.

The term 'inorganic compound' means a salt consisting of a metal cation and inorganic anion. Examples of inorganic compounds include inorganic alkali or alkali earth metal salts such as are found in a dye after synthesis, more particularly sodium or potassium chloride, nitrite, nitrate, sulphate carbonate or bicarbonate. The amount of inorganic compounds present in the solutions and compositions of the invention may be adjusted to the desired level by methods known per se, for example filtration, reverse osmosis, ultrafiltration, dialysis or combinations thereof.

The high strength aqueous solution and composition preferably contain the first and second dye in a weight ratio of 90:10 to 10:90, more preferably 80:20 to 20:80, especially 75:25 to 25:75. If desired the composition may include further dyes to produce variations in colour.

According to a third aspect of the present invention there is provided a compound which, in the free acid form, is of Formula (1) wherein $R^1$, W, X and n are as hereinbefore defined and A is of Formula (2):

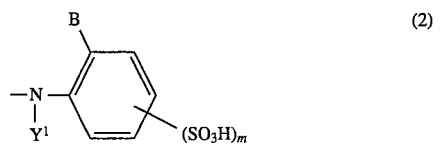

wherein:

$Y^1$ is $C_{1-4}$-alkyl, preferably $C_{1-3}$-alkyl, especially ethyl or isopropyl;

B is H, Cl or $C_{1-4}$-alkyl, especially methyl; and m has a value of 1 or 2, preferably 1;

provided that $Y^1$ is ethyl or isopropyl when B is H.

Examples of preferred groups of Formula (2) include N-isopropyl-4-sulphophenylamino and N-ethyl-4-sulphophenylamino.

The compound according to the third aspect of the present invention is notable for its good build-up, solubility and good wash off properties when applied to cellulosic fibres such as cotton.

In a preferred embodiment B and $Y^1$ contain a total of three carbon atoms, for example B is methyl and $Y^1$ is ethyl or B is H and $Y^1$ is isopropyl.

Dyes and compounds of or used in the invention may be prepared by a process comprising condensation of a compound of Formula (3) and a compound of Formula (4), preferably in the presence of an acid binding agent:

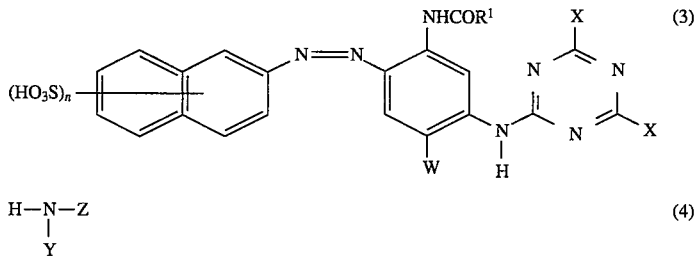

The condensation preferably is performed in an aqueous solvent, especially water, at a temperature of 20° C. to 60° C. The function of the acid binding agent is to neutralise any hydrogen halide formed during the condensation, accordingly any acid binding agent may be used, especially sodium carbonate, bicarbonate or hydroxide.

A compound of Formula (3) may be prepared by condensation of a cyanuric halide with a compound of Formula (5):

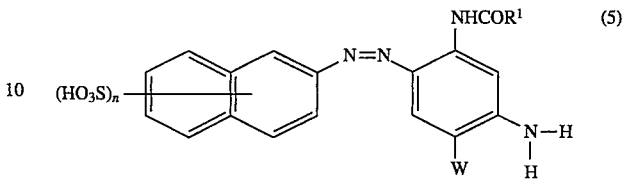

Alternatively a cyanuric halide may be condensed with a compound of Formula (4) and the resultant dichlorotriazine condensed with a compound of Formula (5).

The compound of Formula (5) may be prepared by diazotising an appropriate sulphonated 2-naphthylamine and coupling with an appropriate aniline derivative substituted at the 2-position by W and at the 5-position by —$NHCOR^1$. In the above process n, $R^1$, W, X, Y and Z are as hereinbefore defined.

A composition according to the second aspect of the present invention may be prepared by mixing two or more dyes of Formula (1) or alternatively by following the above process in which a compound of Formula (3) is condensed with a mixture of Formula (4) in place of a compound of Formula (4).

The present invention also provides a process for the coloration of a cellulosic material, especially cotton, by applying thereto a solution, composition or compound according to the invention. The solution, composition or compound of the invention may be applied to cellulosic materials by any of the techniques used for coloration thereof with a reactive dye, for example by a known exhaust dyeing, pad batch dyeing or printing technique, preferably in conjunction with an acid binding agent.

The invention is illustrated but not limited by the following Examples in which all parts are by weight unless stated otherwise.

EXAMPLE 1

Preparation of the compound of Formula (6) wherein X is Cl, $Y^1$ is ethyl and Z is 2-methyl-5-sulphophenyl

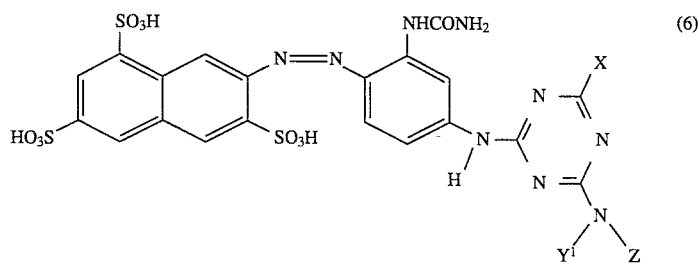

2-Naphthylamine-3,6,8-trisulphonic acid (24.3 g, 0.05M) was dissolved in water (250 ml) by addition of 2N sodium carbonate and 2N-sodium nitrite (25 ml, 0.05M) was added. The resultant solution was converted to a diazonium salt by adding ice (70 g) and cooling to below 10° C. in an ice-bath, adding concentrated hydrochloric acid (30 ml), stirring for 30 minutes and destroying excess nitrous acid by addition of a small amount of sulphamic acid. The diazonium salt was added to 3-ureidoaniline (10 g, 0.05M) over one hour and the temperature maintained below 10° C. The pH was raised to 6 by addition of sodium hydroxide and the solution was stirred overnight at room temperature to give a dyebase which was filtered off and dried.

An aqueous suspension of cyanuric chloride was prepared by adding cyanuric chloride (9.2 g, 0.05M) in acetone (50 ml) to ice-water (100 ml). The suspension was added to a solution of the dyebase in water (250 ml) and stirring at 0°–5° C. and pH 6.5 was continued for 30 minutes resulting in the formation of a dichlorotriazine dye. N-ethyl-o-toluidine-5-sulphonic acid (11 g, 0.05M) was dissolved in water (50 ml) by addition of sodium carbonate, added to the dichlorotriazine dye and warmed to 40° C. at pH 6.5 before stirring overnight. The resultant solution was screened to remove insoluble matter and reduced in volume by rotary evaporation to give a concentrated solution of dye.

The concentrated solution was desalinated in a visking tubing placed in distilled water and the water replaced periodically until no further chloride ions could be detected using silver nitrite and the product precipitated by addition of ethanol to give 46 g of the title product (80% yield) having a lambda max at 417 nm and very high solubility in water.

The title dye was incorporated into an alginate print paste and printed on cotton and viscose to give a print having an attractive golden-yellow shade. The print showed excellent wash-off properties and little cross-staining of adjacent fibres.

EXAMPLE 2

Preparation of the Compound of Formula (6) Wherein X is 4-Carboxypyridinium, $Y^1$ in Ethyl and Z is 2-Methyl-5-Sulphophenyl The product of Example 1 (23 g, 0.02M) was dissolved in water (250 ml) to give a dye solution. Isonicotinic acid (10 g, 0.08M) was dissolved in water (50 ml) by addition of sodium carbonate, added to the dye solution and heated at 90° C. pH 6.5 for 6 hours. The title product was desalinated and isolated by reducing the volume of liquid using a rotary evaporator and precipitation by addition of ethanol.

22 g of the title product was obtained (90% yield) and was found to have a lambda max at 416 nm and very high solubility in water.

The title dye was printed on cotton and viscose to give a print having an attractive golden-yellow shade. The prints showed excellent wash-off properties and little cross-staining in the standard simulated continuous wash-off (SCWOT) test.

In addition the title compound was found to fix rapidly and efficiently when steamed at atmospheric pressure.

EXAMPLE 3

Preparation of the Compound of Formula (6) Wherein X is Cl, $Y^1$ is Isopropyl and Z is 3-Sulphophenyl The method of Example 1 was followed except that in place of N-ethyl-o-toluidine-5-sulphonic acid there was used N-isopropyl metanilic acid (11 g, 0.05M).

The title product was obtained in a yield of 60% (34 g) and found to have a lambda max at 414 nm. The title product had high solubility in water and its prints on cotton were found to have good wash-off with little cross-staining of adjacent fibres.

EXAMPLE 4

Preparation of the Compound of Formula (6) Wherein X is Cl, $Y^1$ is Isopropyl and Z is 4-Sulphophenyl The method of Example 1 was followed except that in place of N-ethyl-o-toluidine-5-sulphonic acid there was used N-isopropyl sulphanilic acid (11 g, 0.05M) to give 39 g (80% yield) of the title product having a lambda max at 416 nm.

The title product was found to have very high solubility in water at 20° C. and good wash-off when printed on cotton.

EXAMPLE 5

Preparation of

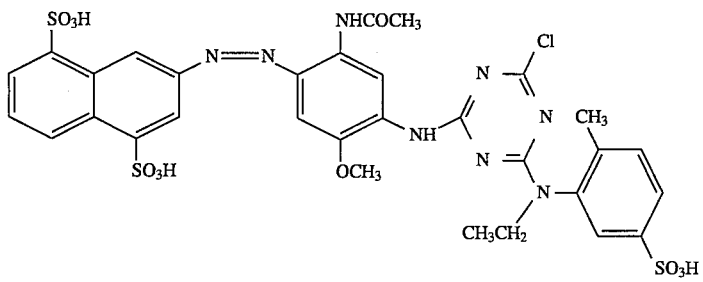

2-Naphthylamine-4,8-disulphonic acid (20 g, 0.05M) was dissolved in water (250 ml) by addition of sodium carbonate. The solution was cooled to below 10° C. and concentrated HCl (30 ml) added, followed by 2N sodium nitrite (25 ml, 0.05M). The resulting suspension was stirred for 60 minutes after which the excess nitrous acid was destroyed by adding sulphamic acid, to give a diazonium salt.

The diazonium salt was added to a solution of 3-amino-4-methoxy acetanilide (10 g, 0.05M) in water (100 ml) over one hour and the temperature maintained below 10° C. The pH was raised to 6 by adding sodium hydroxide solution and the mixture stirred overnight at room temperature to give a dyebase.

An aqueous suspension of cyanuric chloride was prepared by adding cyanuric chloride (9.2 g, 0.05M) in acetone (50 ml) to ice-water (100 ml). The suspension was added to the dyebase at a temperature of 0°–5° C. and about pH 6. After 30 min condensation of the dyebase and cyanuric chloride was complete and the resultant dichlorotriazine product was precipitated by adding salt solution (20% wt/vol), washed with acetone and dried.

N-ethyl-o-toluidine-5-sulphonic acid (11 g, 0.05M) was dissolved in water (50 ml) by adding sodium carbonate and condensed with the above dichlorotriazine product at 40° C., pH 6.5, overnight. The resultant solution was desalinated, concentrated by rotary evaporation and the title product (lambda max 408 nm) was precipitated in 90% yield (55 g) by addition of ethanol.

The title dye had good solubility in water at 25° C. and when printed on cotton gave a print having an attractive golden-yellow shade. The print showed excellent wash-off properties and little cross-staining in the standard SCWOT test.

EXAMPLE 6

Dye Composition and Solution

A first compound (D1) of Formula (6) was prepared in which X is Cl, $Y^1$ is methyl and Z is 3-sulphophenyl by the method described in Example 1 except that in place of N-ethyl-o-toluidine-5-sulphonic acid there was used 3-sulpho-N-methylaniline.

A second compound (D2) of Formula (6) was prepared in which X is Cl, $Y^1$ is methyl and Z is 4-sulphophenyl by the method described in Example 1 except that in place of N-ethyl-o-toluidine-5-sulphonic acid there was used 4-sulpho-N-methylaniline.

As will be understood, the first and second compound are identical in every respect except for the identity of the group represented by Z.

A composition (C1) was prepared comprising the first and second compound by following the method described in Example 1 except that in place of N-ethyl-o-toluidine-5-sulphonic acid there was used a mixture of 3-sulpho-N-methylaniline and 4-sulpho-N-methylaniline. C1 was formed in 80% yield (45 g) and had a lambda max at 411 nm. C1 was found to contain D1 and D2 in a weight ratio of 2:3.

The solubility of C1 in water at 25° C. was found to be higher than that of D1 and D2. The higher solubility of C1 compared with D1 and D2 means that more C1 can be prepared in a given vessel than for D1 or D2.

EXAMPLE 7

Dye Composition and Solution

C1 prepared as in Example 6 was converted into the corresponding composition wherein X is a 4-carboxypyridinium group by heating 0.02M of C1 for 6 hours at 90° C., pH 6.5, in water (50 ml) with isonicotinic acid (10 g, 0.08M) and sodium carbonate (23 g, 0.02M). The product was desalinated and isolated by removal of water on a rotary evaporator and precipitation with ethanol.

A composition analogous to C1 except that X is 4-carboxypyridinium was formed in a yield of 21 g.

EXAMPLE 8

Dye Composition and Solution

A first compound (D3) of Formula (6) was prepared in which X is Cl, $Y^1$ is ethyl and Z is 3-sulphophenyl by the method described in Example 1 except that in place of N-ethyl-o-toluidine-5-sulphonic acid there was used 3-sulpho-N-ethylaniline.

A second compound (D4) of Formula (6) was prepared in which X is Cl, $Y^1$ is ethyl and Z is 4-sulphophenyl by the method described in Example 1 except that in place of N-ethyl-o-toluidine-5-sulphonic acid there was used 4-sulpho-N-ethylaniline.

As will be understood, the first and second compound are identical in every respect except for the identity of the group represented by Z.

A composition (C2) was prepared comprising the first and second compound by following the method described in Example 1 except that in place of N-ethyl-o-toluidine-5-sulphonic acid there was used 3-sulpho-N-ethylaniline and 4-sulpho-N-ethylaniline. C2 resulted in 80% yield (40 g) and had a lambda max at 417 nm.

C2 was found to contain D3 and D4 in a weight ratio of approximately 3:1. C2 was found to have very high solubility in water at 25° C.

EXAMPLE 9

Dye Composition and Solution

A first compound (D5) was prepared according to Example 5 except that in place of N-ethyl-o-toluidine-5-sulphonic acid there was used metanilic acid. D5 was formed in 90% yield (43 g) and had a lambda max at 406 nm.

A second compound (D8) was prepared according to Example 6 except that in place of N-ethyl-o-toluidine-5-sulphonic acid there was used N-isopropylmetanilic acid. D6 was formed in 75% yield (36 g) and had a lambda max at 408 nm.

A composition (C3) was prepared by mixing D5 and D6 in a weight ratio of 1:1. C3 was found to have very high solubility in water.

EXAMPLE 10

Dye Composition and Solution

A first compound (D7) of Formula (6) was prepared in which X is Cl, $Y^1$ is H and Z is 3,5-disulphophenyl by the method described in Example 1 except that in place of N-ethyl-o-toluidine-5-sulphonic acid there was used aniline-3,5-disulphonic acid. D7 was formed in 80% yield and had a lambda max at 414 nm.

A second compound (D6) of Formula (6) was prepared in which X is Cl, $Y^1$ is H and Z is 2,4-disulphophenyl by the method described in Example 1 except that in place of N-ethyl-o-toluidine-5-sulphonic acid there was used aniline-2,4-disulphonic acid. D8 was formed in 50% yield and had a lambda max at 410 nm.

A composition (C4) was prepared by mixing D7 and D8 in a weight ratio of 1:1.

The solubility of C4 in water at 25° C. was found to be higher than that of D7 and D8.

EXAMPLE 11

Dye Composition and Solution

A first compound (D9) was prepared using method of Example 1.

A second compound (D10) of Formula (6) was prepared in which X is Cl, $Y^1$ is H and Z is 2-methyl-5-sulphophenyl by the method described in Example 1 except that in place of N-ethyl-o-toluidine-5-sulphonic acid there was used o-toluidine-5-sulphonic acid. D10 was formed in 80% yield and had a lambda max at 415 nm.

As will be understood, the first and second compound are identical in every respect except for the identity of the group represented in Formula (6) by $Y^1$.

A composition (C5) was prepared by mixing D9 and D10 in a weight ratio of 2:1 and had a lambda max at 415 nm.

The solubility of C5 in water at 25° C. was found to be higher than that of D9 and D10.

EXAMPLE 12

The method of Example 1 may be repeated except that in place of 3-ureido aniline there is used 0.05M of 3-acetamido aniline.

EXAMPLE 13 TO 17

High strength aqueous solutions may be prepared according to the formulations described in Table I below wherein the second column identifies the composition and amount (in brackets), and the third and fourth columns show respectively the amount of water and salt. All amounts are parts by weight.

TABLE I

| Example | Composition | Water | Salt |
|---|---|---|---|
| 13 | C1 (35) | 100 | <1 |
| 14 | C2 (40) | 100 | <1 |
| 15 | C3 (45) | 100 | <1 |
| 16 | C4 (30) | 100 | <2 |
| 17 | C5 (45) | 100 | <1 |

We claim:

1. A high strength aqueous solution comprising a first and second dye each of which, in the free acid form, is of Formula (1):

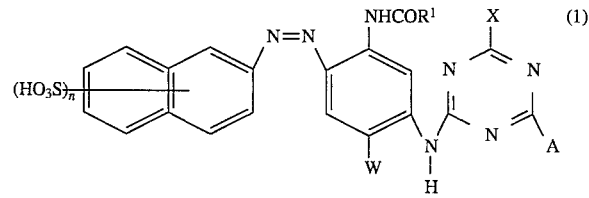

wherein:

$R^1$ is $NH_2$ or alkyl;

W is H, alkyl or alkoxy;

X is a halogen atom or a quaternary ammonium group;

A is

Y is H or alkyl;

Z is phenyl group having one ortho halo or alkyl substituent, a sulpho substituent, or both an ortho halo or alkyl substituent and a sulpho substituent; and n has a value of 1 to 3;

provided that (i) the groups defined by A in the first and second dye are different to one another; and (ii) the solution contains less than 5% by weight of inorganic compounds.

2. A solution according to claim 1 wherein Y is alkyl.

3. A solution according to claim 1 wherein the total amount of first and second dye is at least 20% by weight.

4. A solution according to claim 1 which contains less than 20% by weight of urea.

5. A composition comprising a first and second dye each of which, in the free acid form, is of Formula (1):

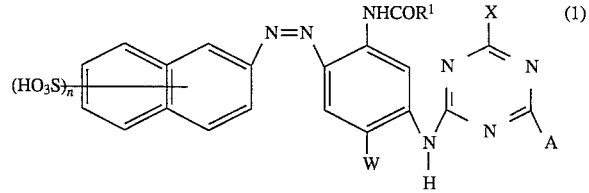

wherein:

$R^1$, W, X, A and n are as defined in claim 1 and provided that the groups defined by A in the first and second dye are different to one another and provided that $R^1$ is $NH_2$ when W is H.

6. A composition according to claim 5 wherein the first and second dye are identical to one another in every respect except for the identity of A.

7. A composition according to claim 5 which contains less than 10% by weight of inorganic compounds.

8. A composition according to claim 5 or claim 6 wherein Y is alkyl.

9. A composition according to claim 5 wherein the first and second dye are present in a weight ratio of 90:10 to 10:90.

10. A solution according to claim 1 wherein said inorganic compound consists of a metal cation and an inorganic anion.

11. A solution according to claim 1 wherein said inorganic compounds are sodium or potassium chloride, nitrite, nitrate, sulphate, carbonate or bicarbonate.

12. A solution according to claim 1 wherein Z is selected from the group consisting of phenyl, 2-sulphophenyl, 3-sulphophenyl, 4-sulphophenyl, 2-methyl-4-sulphophenyl and 2-methyl- 5-sulphophenyl.

13. A solution according to claim 1 wherein n has a value of 3.

14. A compound which, in the free acid form, is of Formula (1):

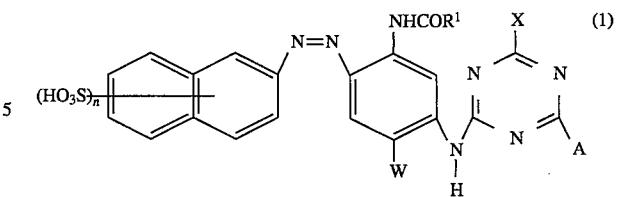

wherein:

$R^1$, W, X and n are as defined in claim 1 and A is of the Formula (2):

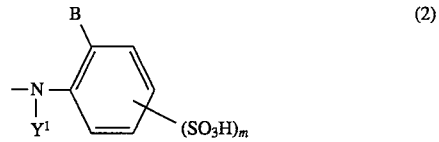

wherein:

$Y^1$ is $C_{1-4}$-alkyl;

B is H, Cl or $C_{1-4}$-alkyl; and m has a value of 1 or 2;

provided that $Y^1$ is ethyl or isopropyl when B is H.

15. A compound according to claim 14 wherein $Y^1$ is ethyl or isopropyl.

16. A compound according to claim 14 or 15 wherein B is Cl or $C_{1-4}$-alkyl.

* * * * *